United States Patent
Mahoney et al.

(10) Patent No.: US 6,519,607 B1
(45) Date of Patent: Feb. 11, 2003

(54) IMAGE DRIVEN OPERATING SYSTEM

(75) Inventors: Terry P. Mahoney, Boise, ID (US); Angela K. Hanson, Eagle, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/429,772

(22) Filed: Oct. 28, 1999

(51) Int. Cl.[7] .................................................. G06F 17/30
(52) U.S. Cl. .................................. 707/104; 707/6; 707/7
(58) Field of Search ........................ 707/6, 7, 10, 102, 707/103, 104; 382/313, 227, 198, 232; 345/418, 40

(56) References Cited

U.S. PATENT DOCUMENTS

| | | | | |
|---|---|---|---|---|
| 5,031,228 A | * | 7/1991 | Lu .............................. | 382/227 |
| 5,267,332 A | * | 11/1993 | Walch et al. ................ | 382/198 |
| 5,966,129 A | * | 10/1999 | Matsukuma et al. ........ | 345/418 |
| 6,064,771 A | * | 5/2000 | Migdal et al. ............... | 362/232 |
| 6,157,435 A | * | 12/2000 | Slater et al. .................. | 355/40 |
| 6,289,140 B1 | * | 9/2001 | Oliver ......................... | 382/313 |
| 6,295,391 B1 | * | 9/2001 | Rudd et al. .................. | 382/313 |

* cited by examiner

Primary Examiner—Sanjiv Shah

(57) ABSTRACT

A method of controlling a computing device, comprising the steps of: capturing an image; electronically comparing the captured image to at least one stored image having a command associated therewith, and determining if there is a match within a predetermined threshold; and executing the associated command.

20 Claims, 3 Drawing Sheets

IMAGE DRIVEN OPERATING SYSTEM

BACKGROUND OF THE INVENTION

1. Field of the Invention

The invention relates generally to computing resources, and more particularly to providing macro commands to a computing resource by means of gestures, or sign language, or some other image.

2. Description of the Related Art

Computing resources are frequently used in environments where it is difficult for the user to physically touch a keyboard or a pointing device such as a mouse. For example, the user may be wearing gloves or other protective gear, or may be in an environment where the user's fingers are too dirty to operate the device. Additionally, there may be circumstances where the computing resource is remote from the user and it is not possible, or safe or convenient for a user to physically touch a keyboard for controlling the remote computing resource.

SUMMARY OF THE INVENTION

The foregoing problems are solved, in one aspect of the invention by providing a method including the steps of capturing an image; electronically comparing the captured image to at least one stored image having a command associated therewith, and determining if there is a match within a pre-determined threshold; and executing the associated command.

In a further aspect, the invention includes the step of electronically associating each of a plurality of images with a different command.

In a yet further aspect, the capturing step comprises capturing an image in a near-field image pattern.

In a yet further aspect of the invention, the capturing step comprises capturing an image resulting from the cumulative changes between a plurality of captured image patterns.

In a yet further aspect of the invention, the comparing step comprises varying the predetermined threshold based on a parameter.

In a yet further aspect of the invention, the comparing step comprises varying the predetermined threshold based on a system status.

In a yet further aspect, the invention comprises the step of a user creating the image by moving an object having increased detectability by an image capture device.

In yet a further aspect of the invention, the object being moved is at least one glove.

In another embodiment, the invention comprises an image driven computing resource including: an image capture device to capture an image; a database of previously stored images; a computer device programmed to compare the captured image with at least one image in the database and determine if there is a match to an image in the database of previously stored images to within a predetermined threshold, and, if a match is found, then performing a command associated with the matched previously stored image.

In yet a further embodiment, the invention comprises a computer program product including: a computer usable medium having computer readable program code embodied therein for controlling a computing resource with captured images, comprising: code for receiving at least one captured image pattern and determining an image therefrom; code for comparing the determined image to images stored in an image database and determining if there is a matched image within a predetermined threshold; code for associating a matched image to a command; and code for executing the command.

DETAILED DESCRIPTION OF THE PREFERRED EMBODIMENT

Figure 1:
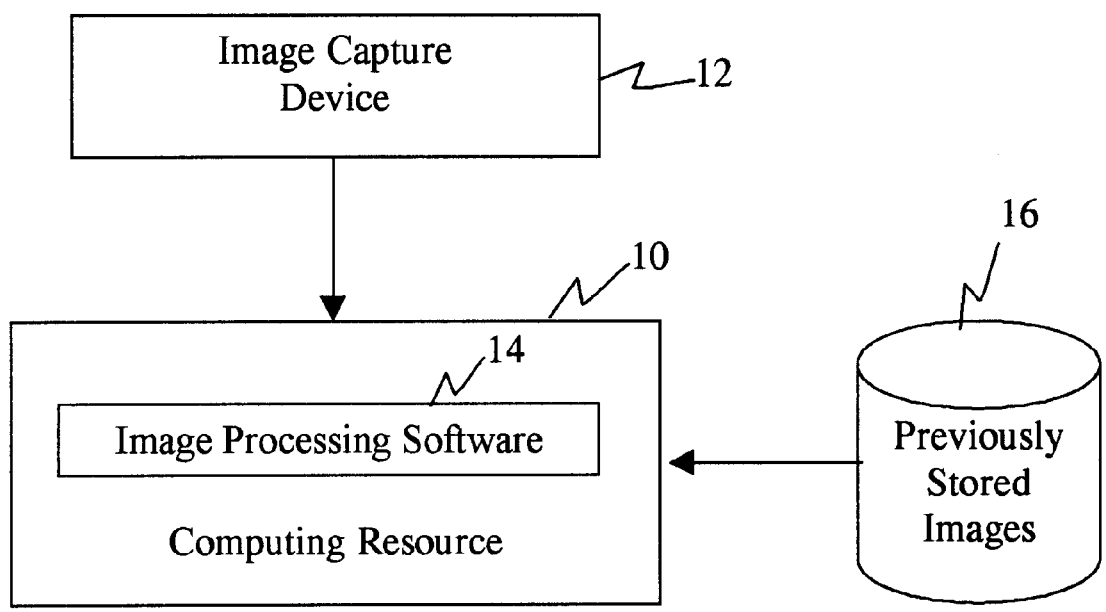
FIG. 1 is a schematic diagram of one embodiment of the present invention.

The present invention comprises a method, system, and computer program product for controlling a computing device. Referring now to FIG. 1, there is shown one embodiment of the present invention. Block 10 represents a standard computing resource which may be hard wired or programmed to perform various applications. By way of example, but not by way of limitation, this computing resource 10 may be implemented by a personal computer. The personal computer 10 is programmed to process images, as will be described in detail below. An image capture device 12 is provided for capturing image patterns for controlling the computing resource 10. Note that in a preferred embodiment, this image capture device may be simply implemented by means of a digital video camera or a camcorder disposed on the top of a monitor screen for the computing resource 10. In the embodiment shown in FIG. 1, the image capture device sends captured image patterns to the computing resource 10 to be processed by image processing software 14 loaded into the computing resource. Note that although this is a convenient implementation, The invention is not limited to performing the image processing in the computing resource 10. This image processing can be performed in any convenient location, including within the image capture device 12 itself.

The image processing software 14 operates to compare an image obtained from a captured image pattern to previously stored images for a matched image. These previously stored images may be disposed in a database 16, which may be disposed at any convenient location, either separate from or within the computing resource 10.

A variety of different previously stored images may be included in the database 10. By way of example, but not by way of limitation, an image of a face may be stored, or the images of various command gestures such as a circle, a cross, or an x may be stored.

There are a variety of methods by which a user may create an image pattern which may be captured by the image capture device 12. For example, an image pattern could be created simply by the user positioning himself so that an image pattern of his face is captured. Alternatively, the user could make hand gestures or finger gestures in front of the image capture device 12. Alternatively, the user could make a motion with his hand or his finger, such as a motion of creating a circle, or a cross, or an X. To facilitate this aspect, the user could hold and move an object having increased detectability by the image capture device 12 in front of device 12. For example, the user could hold a light and move the light to create a particular pattern or sign. Alternatively, the user could wear special gloves which enhance image capture by the image capture device 12. Alternatively, the user could hold a physical implementation of a circle or an X or a cross in front of the image capture device. Alternatively, the image capture device 12 could be a special pad that is sensitive to pressure, or light, or charge, or radiation, or electromagnetic waves, or other phenomena, and the user could create an image by contacting the pad with a finger, or implement (assuming that the pad is pressure sensitive), and then making a particular pattern or sign on the pad.

If the image process software 14 determines that there is a match with a previously stored image, then the software determines which command is associated with that matched image. By way of example, but not by way of limitation, a typical means for associating previously stored images with commands is by means of a table. This stored table would list each previously stored image and a command associated therewith. The associated commands may comprise single commands, or may implement a series of sub-commands or a macro program.

The next step is to execute the command associated with a matched image.

Figure 2:
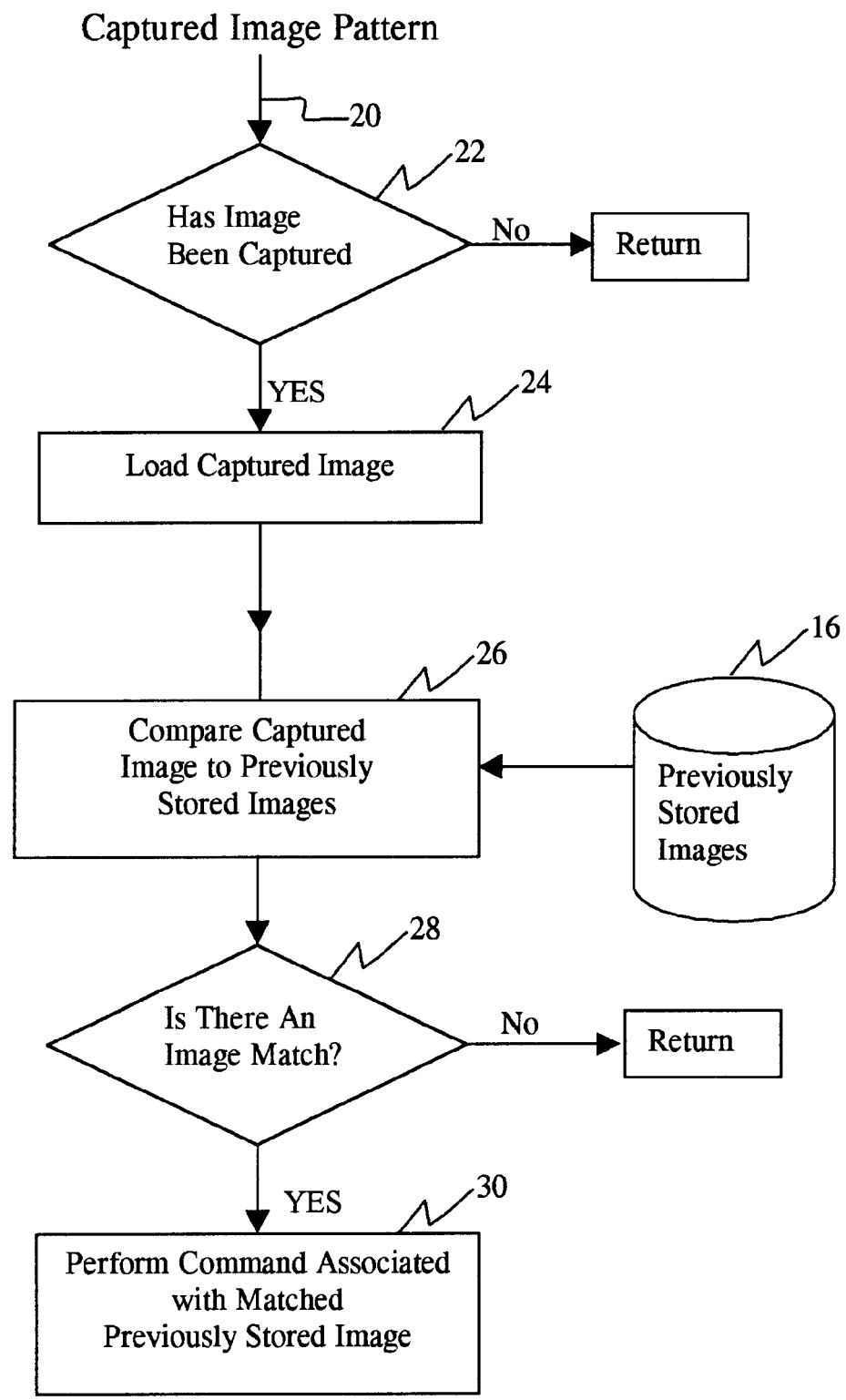
FIG. 2 is a block diagram of an embodiment of the method and program code used to implement the present invention.

Referring now to FIG. 2, there is shown an embodiment of an image processing software 14. A captured image pattern input is provided on line 20. The first step in the executing program is block 22, wherein it is determined whether an image pattern has been captured. This determination may be made, for example, by comparing the image pattern to a background pattern, or by some other convenient comparison. If the answer is NO, then the executing program returns. If the answer is YES, then the executing program loads the captured image pattern in block 24 so that it may be compared to previously stored images. The next step in the executing program at block 26 is to compare to determine if an image is present in the captured image pattern which matches a previously stored image from the database 16. The next step for the executing program at block 28 is to determine if there is an image match between an image found in the captured image pattern and the previously stored images in block 28 to within a predetermined threshold. If the answer is NO, then the executing program returns. If the answer is YES, then the executing program determines if there is a command associated with the matched previously stored image in block 30. This association determination is typically performed by accessing a table of associations between previously stored images and commands. The command, or a sequence of sub-commands, or a macro may then be executed in block 30. Note that the command performing block may be accomplished simply by passing the associated command to standard controller software that interacts with the operating system of the computing resource.

In one embodiment, the image capture device 12 may be designed only to capture near-field image pattern. A near-field image pattern means an image pattern disposed within a pre-determined distance from said image capture device 12. For example, the user may have to make a hand gesture, or finger gesture, or hand or finger motion within a certain distance from the image capture device 12. One method for implementing this near-field image pattern capture is by setting the focus for the optical elements in the image capture device 12.

It should be noted that the present invention can be utilized for stationary images such as a user's face, or a hand position, or a finger position, or a physical embodiment of an image, as noted above. Additionally, the image processing software can include logic to extract or recognize an image from motion, such as the motion a hand, the motion of an arm, or the motion of a finger. In order to implement this image capture from motion, by way of example, but not by way of limitation, a set of previous captured image patterns for which the image processing software 14 had not found an image match with a previously stored image in the previously stored images database, may be used to extract the cumulative changes between a plurality of these captured image patterns.

Figure 3:
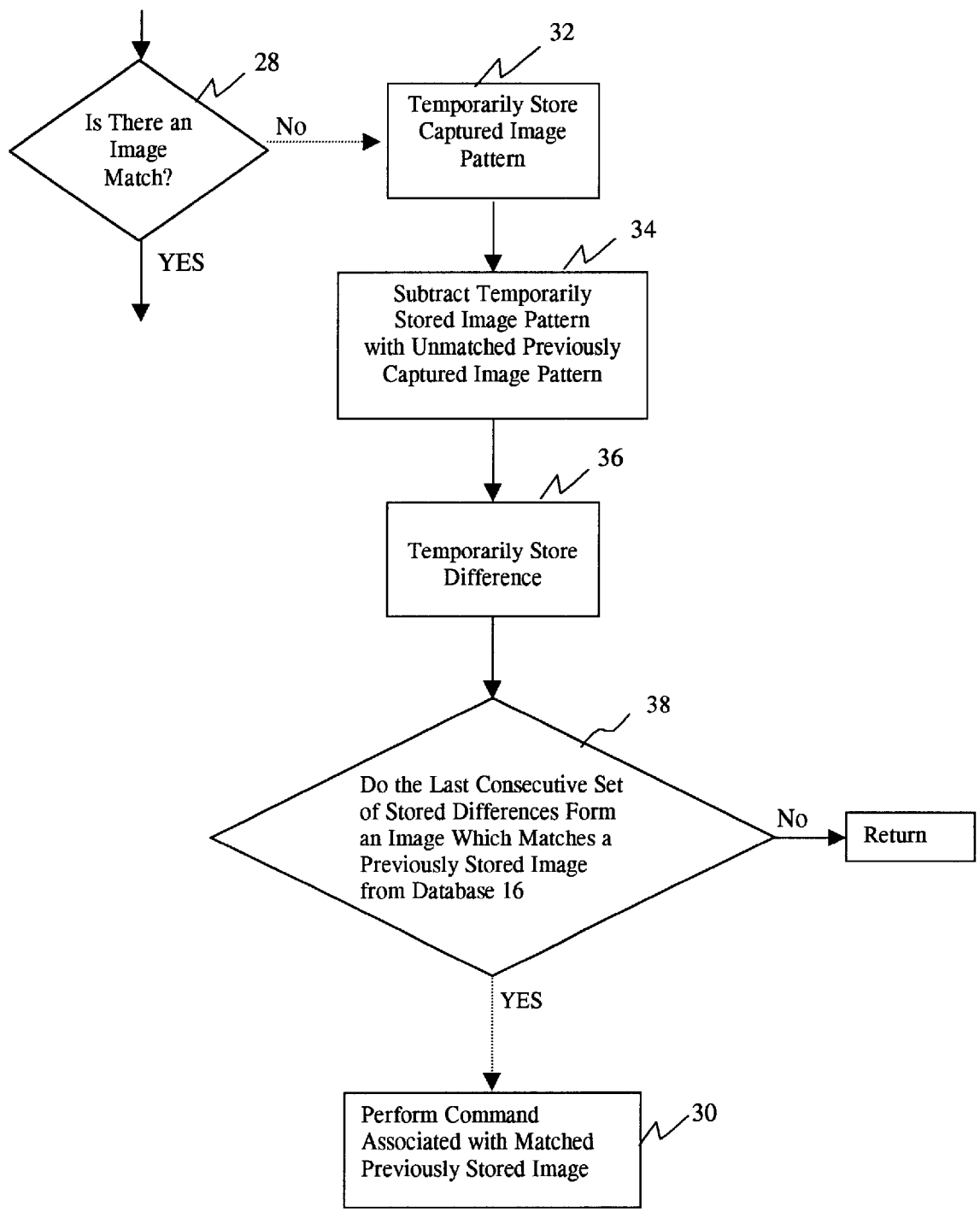
FIG. 3 is a schematic diagram of a further aspect of the method of FIG. 2.

Referring now to FIG. 3, there is shown an embodiment of the image processing software which may be utilized to extract an image from a cumulative set of changes in image patterns and determine whether that extracted image matches with a previously stored image from database 16. Referring to FIG. 3, when the executing program reaches the decision step 28 and determines that there is not an image match between the captured image and a previously stored image, the captured image pattern may be temporarily stored in block 32. This temporarily stored image pattern is then subtracted from an unmatched previously captured image pattern in block 34. The executing program then temporarily stores this difference in block 36. Then, in block 38 the executing program determines whether the last consecutive set of stored differences form an image which matches a previously stored image from the database 16. If the determination is NO, then the executing program returns. If the executing program determines that there is a match, then the executing program performs a command associated with the matched previously stored image in block 30. Note that there are a variety of methods by which an image can be extracted from motion, and the present invention is not limited to one particular approach.

It should be noted that the comparison steps typically will not require precise matches between the images. In this regard, normally a threshold will be set in order to determine whether an image match has occurred. This threshold may be set empirically depending on the particular work environment in which the system is located.

It should be noted that the previously stored image database 16 may be updated periodically by downloads from another computing device accessible over a network or by accessing a URL address on the internet. This updating may be accomplished by simply updating specific entries in the previously stored images database 16, or by replacing the entire set of previously stored images. Likewise, the stored associations between previously stored images and specific commands may be revised and updated by downloading revisions to a set of specific previously stored image/command associations, or by replacing an entire table of such associations.

It should be noted that the threshold may change depending on the status of the system. For example, when a comparison is being performed between the image of a face and the previously stored image of a face for purposes of log-in, a very high threshold requirement may be set such as a 90% match of specific spatial characteristics before a match will be determined. Once a spatial match has been determined and a login has been processed, then the threshold may be dropped to a lower level for the recognition of simplified arm, or hand, or finger positions, or for recognizing an image created by a specific pattern of motion.

In essence, what has been disclosed in the present invention is a computing resource which has been programmed to take actions or commands based on what it sees from an image capture system. This process is very similar to the eyes and the brain in the human body.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method of controlling a computing device, comprising the steps of:

capturing an image;

electronically comparing said captured image to different stored images, each of a plurality of the different stored images having a different command associated therewith, and determining if there is a match to one of the stored images within a predetermined threshold; and executing said associated command.

2. A method as defined in claim 1, wherein said command comprises a sequence of sub-commands.

3. A method as defined in claim 1, wherein said capturing step comprises capturing an image in a near-field image pattern.

4. A method as defined in claim 1, wherein said capturing step comprises capturing an image resulting from the cumulative changes between a plurality of captured image patterns.

5. A method as defined in claim 4, wherein said capturing step comprises capturing an image from the changes between consecutive images.

6. A method as defined in claim 1, wherein said comparing step comprises varying said predetermined threshold based on a parameter.

7. A method as defined in claim 1, wherein said comparing step comprises varying said predetermined threshold based on a system status.

8. A method as defined in claim 1, further comprising the step of a user creating said image by moving an object having increased detectability by an image capture device.

9. A method as defined in claim 8, wherein said object is at least one image-enhancing glove.

10. An image driven computing resource comprising:

an image capture device to capture an image;

a database of previously stored images, each of a plurality of the different stored images having a different command associated therewith;

a computer device programmed to compare said captured image with at least one image in said database and determine if there is a match to one of the different stored images in said database of previously stored images to within a predetermined threshold, and, if a match is found, then performing a command associated with said matched previously stored image.

11. A computing resource as defined in claim 10, wherein said image capture device includes logic to capture an image in a near-field image pattern.

12. A computing resource as defined in claim 10, wherein said image capture device includes logic to capture an image resulting from cumulative changes between a plurality of image patterns.

13. A computing resource as defined in claim 10, wherein said image capture device includes logic to capture an image resulting from the changes between a plurality of consecutive image patterns.

14. A computing resource as defined in claim 10, wherein said computer device is programmed to vary said predetermined threshold based on a parameter.

15. A computer resource as defined in claim 10, wherein said computing resource is programmed to vary said predetermined threshold based on a system status.

16. A computer program product comprising:

a computer usable medium having computer readable program code embodied therein for controlling a computing resource with captured images, comprising:

code for receiving at least one captured image pattern and determining an image therefrom;

code for comparing said determined image to different images stored in an image database, each of a plurality of the different stored images having a different command associated therewith, and determining if there is a match to one of the different stored images within a predetermined threshold;

code for associating a matched image to a command; and code for executing said associated command.

17. A computer program product as defined in claim 16, wherein said code for determining an image includes code for capturing an image resulting from the cumulative changes between a plurality of captured image patterns.

18. A computer program product as defined in claim 16, wherein said code for determining an image includes code for capturing an image resulting from cumulative changes between a plurality of consecutive images.

19. A computer program product as defined in claim 16, wherein said code for comparing further comprises code for varying said predetermined threshold based on a parameter.

20. A computer program product as defined in claim 16, wherein said code for comparing further comprises code for varying said predetermined threshold based on a system parameter.

* * * * *